United States Patent [19]
Beckman et al.

[11] 3,732,498

[45] May 8, 1973

[54] FINE-TUNING AND STEREO INDICATOR SYSTEM

[75] Inventors: Orval E. Beckman, Wheaton; Walter Klymkiw, Chicago, both of Ill.

[73] Assignee: Zenith Radio Corporation, Chicago, Ill.

[22] Filed: Oct. 12, 1971

[21] Appl. No.: 188,051

[52] U.S. Cl. ............325/398, 179/15 BT, 116/124.1, 116/124.4, 325/455

[51] Int. Cl. ............H04b 1/16

[58] Field of Search ............325/398, 364, 455; 179/15 BT; 116/124.1 R, 124.4, 124.3; 240/2.1; 340/373, 380

[56] References Cited

UNITED STATES PATENTS

| | | | |
|---|---|---|---|
| 3,679,979 | 7/1972 | Kreps, Jr. et al. | 179/15 BT |
| 2,182,678 | 12/1939 | Root | 325/398 X |
| 2,582,951 | 1/1952 | Barry | 116/124.1 R |
| 3,613,007 | 10/1971 | Endres | 325/455 |
| 2,122,998 | 7/1938 | Brodton | 116/124.1 R |
| 2,511,888 | 6/1950 | Weingarten | 325/455 X |

*Primary Examiner*—Benedict V. Safourek
*Attorney*—Cornelius J. O'Connor et al.

[57] ABSTRACT

A fine-tuning and stereo indicator system for an AM-FM radio receiver capable of receiving FM stereo broadcast signals. The indicator system utilizes two lamps integrally mounted within a dial pointer carriage assembly to illuminate a dial pointer exhibiting light-conductive properties. Whenever a monophonic radio signal is received, the dial pointer glows with a variable intensity representative of the received signal-strength, i.e., fine-tuning. Upon receiving a stereophonic broadcast signal, the fine-tuning lamp is extinguished, and the stereo indicator lamp is fully illuminated and subsequently filtered to impart a second distinctive color (e.g., red) to the dial pointer indicative of stereo reception.

3 Claims, 2 Drawing Figures

FINE-TUNING AND STEREO INDICATOR SYSTEM

BACKGROUND OF THE INVENTION

The present invention relates generally to improvements in radio receivers and more particularly to a visual, fine-tuning and FM stereo indicator system for incorporation in an AM-FM radio receiver.

Prior to the present invention, most visual fine-tuning aids, whether in the form of a variable intensity lamp or a tuning meter, have been positioned adjacent to the radio receiver's dial scale. As the receiver is tuned to the desired AM or FM broadcast station, the operator's eyes are generally focused to follow the dial pointer as it travels across the dial scale thereby assuring that the desired station is selected. Accordingly, in prior art fine-tuning indicator systems, the operator must divert his eyes from the dial point to the tuning indicator in order to fine-tune the receiver upon selecting a station.

Similarly, AM-FM stereo receivers typically include a stereo reception indicator which, like the tuning indicator, is in close proximity to the dial scale, but in some instances, at the end opposite the tuning indicator. Thus, if the operator wishes to receive an FM stereo signal, he must simultaneously monitor the dial pointer, the tuning indicator and the stereo reception indicator. This obviously increases the complexity of the tuning operation.

SUMMARY OF THE INVENTION

Accordingly, it is an object of the invention to provide an improved, visual, fine-tuning and FM stereo indicator system for an AM-FM radio receiver capable of reproducing FM stereo broadcasts.

A more particular object of the invention is to provide an improved, visual, fine-tuning and FM stereo indicator system which may be incorporated within the dial pointer thereby eliminating the necessity of positioning fine-tuning indicators and stereo reception indicators adjacent to the dial scale.

A further object of the invention is to provide a dial pointer which illuminates upon reception of an AM or FM radio signal, varies in intensity in accordance with the strength of the received signal, and exhibits a change in color when a stereophonic broadcast is received.

In accordance with the present invention, a fine-tuning and stereo indicator system is provided for aiding in the fine-tuning of a radio receiver and for indicating the reception of an FM stereo broadcast signal. The fine-tuning and stereo indicator system of the present invention contemplates mounting two lamps within the dial pointer carriage assembly used in transporting the dial pointer across the dial scale. The first lamp generates a variable intensity light representative of the signal strength, or fine-tuning, of a received broadcast signal. The second lamp is illuminated only during reception of a stereo broadcast signal during which time the first lamp is extinguished. The dial pointer is constructed from a plastic, light-conductive material and placed proximate to the two lamps such that the dial pointer glows with increased intensity as the radio receiver is fine-tuned and exhibits a color change when a stereo broadcast signal is received.

BRIEF DESCRIPTION OF THE DRAWING

The features of this invention which are believed to be novel are set forth with particularity in the appended claims. The invention together with its further objects and advantages thereof, may be best understood, however, by reference to the following description taken in conjunction with the accompanying drawings, in which like reference numerals refer to like elements in the several figures and in which:

PREFERRED EMBODIMENT OF THE INVENTION

Figures 1, 2:
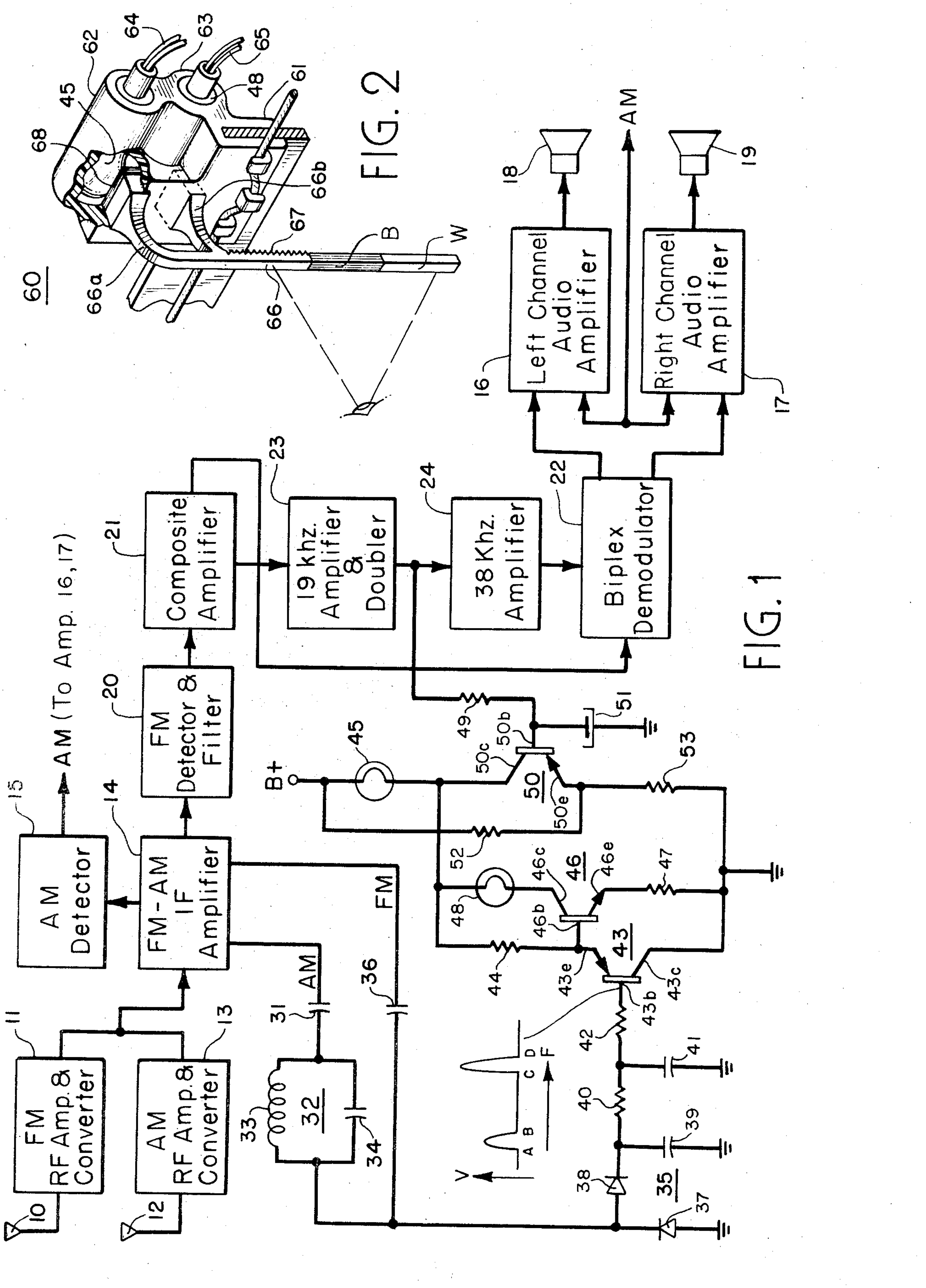
FIG. 1 is a combined schematic and block diagram of a radio receiver which includes a fine-tuning and stereo indicator system in accordance with the invention.
FIG. 2 is a perspective view of a novel dial pointer and carriage assembly in accordance with one embodiment of the invention.

Referring now to FIG. 1, an AM-FM radio receiver capable of reproducing FM stereo broadcasts is shown which incorporates a visual, fine-tuning and FM stereo indicator system in accordance with the present invention. The receiver includes an FM antenna 10 which intercepts frequency-modulated (FM) signals and couples them in a conventional manner to an FM radio-frequency (RF) amplifier and converter stage 11 wherein the signals are amplified and translated to an intermediate-frequency. Alternatively, an AM antenna 12 couples amplitude-modulated (AM) signals to an AM radio-frequency (RF) amplifier and converter stage 13 wherein the received AM signals are amplified and converted to an intermediate-frequency. In either case, the resultant IF signal is coupled to an AM-FM intermediate-frequency (IF) amplifier stage 14, which may comprise a plurality of individual tuned amplifier and limiting circuits for subsequent amplification.

During AM signal reception, an IF output signal from IF amplifier 14 is applied to an AM detector 15 wherein the AM modulated wave is detected with the resulting output signal having the same characteristics as the original AM broadcast. The detected AM signal is then coupled to conventional left and right channel audio amplifiers 16 and 17, respectively, which in turn drive loudspeakers 18 and 19.

When the receiver is operated in the FM stereo mode, an IF output signal from the IF amplifier 14 is coupled to an FM detector and filter 20 wherein the received carrier transmission is demodulated to obtain a composite modulation signal at the detector output. The composite signal from FM detector 20 consists of three components: an audio frequency component representing the sum (L+R) of the left and right audio signal which comprise the stereophonic program, a 38 kHz suppressed-carrier subcarrier component representing the difference (L−R) of the same two audio signals, and a 19 kHz pilot-carrier component. The composite output signal from FM detector 20 is amplified by composite amplifier 21 and applied to the biplex demodulator 22. In order to detect the suppressed-carrier amplitude-modulated subcarrier, it is necessary to apply to the biplex demodulator 22 a 38 kHz demodulation or switching signal which corresponds to the carrier component of the suppressed-carrier subcarrier signal. The 19 kHz pilot-carrier contained in the composite signal is amplified by a 19 kHz amplifier and doubler 23 wherein a 38 kHz switching signal is generated. The regenerated 38 kHz demodulating signal is then coupled to a 38 kHz amplifier 24 for amplification prior to its application to the biplex demodulator 22. The biplex demodulator 22 reinserts the 38 kHz subcarrier switching signal into the (L—R) 38 kHz suppressed-carrier subcarrier component from composite amplifier 21 and demodulates this signal into the (L—R) audio signal. Demodulator 22 further matrixes the (L+R) audio signal from composite amplifier 21 and the (L—R) audio signal to produce audio signals of the form (2L) and (2R), which correspond to the desired left and right stereophonic program signals. The left and right channel audio signals are then applied to a left channel audio amplifier 16 and a right channel audio amplifier 17, respectively. The left and right channel audio amplifiers 16 and 17, in turn, drive the loudspeakers 18 and 19, respectively.

During monaural (non-stereo) FM transmission, the 19 kHz pilot-carrier is not transmitted and, as a result, no 38 kHz switching signal is applied to the biplex demodulator 22. Consequently, the (L+R) signal is reproduced at equal levels in both the left and right stereo channels, as required for proper monophonic program reproduction.

As thus far described, the receiver is conventional in general construction and operation such that further and more particular consideration, however, may now be given to that portion of the receiver which relates to the preferred embodiment of the present invention, and in general constitutes a visual, fine-tuning and FM stereo indicator system.

Operationally, when the receiver is operated in the AM mode, a portion of the AM intermediate-frequency signal from IF amplifier 14 is a-c coupled by capacitor 31 to a 10.7 MHz trap 32 comprised of an inductance 33 connected in parallel with a capacitor 34. The IF signal is, in turn, coupled from the 10.7 MHz trap 32 to an amplitude detector circuit identified generally at 35. Alternatively, when an FM signal is received, the FM intermediate-frequency signal is a-c coupled by a capacitor 36 to detector 35. Diode 37 and diode 38 which comprise detector 35 are connected in a voltage doubler configuration to peak rectify the IF signal such that the variable d-c control voltage developed at the junction of diode 38 and capacitor 39 is indicative of the received signal strength, i.e., proper tuning. Any high-frequency interference is then filtered from the resultant d-c voltage by a capacitor 41 having one terminal connected directly to ground and its other terminal coupled to the junction of diode 38 and capacitor 39 by a resistor 40.

The frequency intervals AB and CD of the resultant d-c control voltage illustrated in FIG. 1 are representative of received broadcasts of differing signal strength while interval BC typifies the absence of a received broadcast. If the illustration were enlarged to include all the broadcast stations which may be received in any given area, the "humps" such as AB would correspond to each station along the AM or FM signal band. The d-c control voltage is applied by a resistor 42 to the base electrode 43*b* of transistor 43 which is connected in an emitter follower configuration wherein the collector electrode 43*c* is grounded. Operating potential is coupled to transistor 43 by the serially connected resistor 44 and stereo indicator lamp 45 interconnected between the emitter electrode 43*e* and a source of d-c potential (B+). As previously noted, when an AM or an FM station corresponding to interval AB of FIG. 1 is tuned in, the control voltage at base electrode 43*b* becomes increasingly positive finally driving transistor 43 to cut-off. As a result, the emitter current through resistor 44 is reduced and the voltage drop across resistor 44 is similarly decreased. Accordingly, as the desired station is tuned-in, emitter electrode 43*e* will experience d-c voltage variations similar to those impressed on the base electrode 43*b*.

The emitter electrode 43*e* is coupled directly to the base electrode 46*b* of tuning indicator transistor 46. A resistor 47 is interconnected between the emitter electrode 46*e* and ground to stabilize the quiescent operating point of transistor 46 by introducing feedback. D-C operating potential for the collector electrode 46*c* is obtained by coupling a fine-tuning indicator lamp 48 to the junction of resistor 44 and lamp 45. When the bias on base electrode 46*b* increases corresponding to a tuned-in AM or FM broadcast station, the collector current likewise increases illuminating lamp 48. Accordingly, the illumination of lamp 48 will vary in intensity according to the level of d-c bias applied to base electrode 46*b*. As the receiver is tuned up the slope of AB or CD, the illumination intensity of lamp 48 will increase until the strongest signal or maximum intensity, i.e., proper fine-tuning, is achieved. During the interval BC when the receiver is not tuned to a broadcast station, transistor 46 is biased such that the resultant current through lamp 48 is insufficient to light it. Thus, if the illumination intensity of tuning indicator lamp 48 were charted, it would follow directly the d-c control voltage applied to base electrode 43*b*.

Means which may be combined with the above-described fine-tuning indicator circuit are also provided to indicate the presence of an FM stereo signal. As previously mentioned, a 19 kHz pilot-carrier signal is received during FM stereo reception. After amplification and frequency doubling by the 19 kHz Amplifier and Doubler 23, the resultant 38 kHz pulses are coupled by resistor 49 to the base electrode 50*b* of stereo indicator switch transistor 50. A filter capacitor 51 bypasses the base electrode 50*b* to ground. The bias on emitter electrode 50*e* is derived from the junction of a voltage divider network comprising resistors 52 and 53 coupled between B+ and ground while collector electrode 50*c* is coupled directly to B+ by lamp 45. Transistor 50 and lamp 45 may be considered equivalent to a series resistive network comprising a switch (transistor 50) and a fixed resistor (lamp 45). When an FM stereo signal is received, the 39 kHz signal drives transistor 50 into saturation thereby reducing its equivalent resistance to nearly zero. Accordingly, as the d-c voltage at collector 50*c* drops toward ground potential, tuning lamp 48 is turned off at the precise moment the stereo indicator lamp 45 is illuminated thereby indicating that the receiver is receiving an FM stereo signal. By selecting lamp 48 to have half the current rating of lamp 45, it is insured that lamp 45 will be darkened but conducting when lamp 48 is initially illuminated. When an FM monophonic signal is received, however, transistor 50 will be reverse-biased due to the absence of 38 kHz pulses at the base electrode 50*b* and the stereo indicator lamp 45 will not light; instead tuning indicator lamp 48 will remain illuminated.

In the preferred embodiment of the invention illustrated in FIG. 2, the stereo indicator lamp 45 and the fine-tuning indicator lamp 48 are integrally mounted within a movable dial pointer and carriage assembly 60 which may be manually tuned across the AM-FM dial scale. Assembly 60, which is shown from the viewpoint of the operator, is comprised in part by a carriage 61 having two preformed cylindrical cavities 62 and 63 for mounting lamps 45 and 48, respectively, therein. Flexible, electrical leads 64 and 65 connect the lamps 45 and 48 to the remainder of the fine-tuning and stereo indicator system illustrated in FIG. 1. The arms 66*a* and 66*b* of an "f"-shaped dial pointer 66 are inserted into the carriage 62 such that their respective ends abut the cavities 62 and 63. Pointer 66, including arms 66*a* and 66*b*, is comprised of a plastic, light-conducting material such as an acrylic resin, so that the light generated by lamp 48 will be conducted through arm 66*b* to fully illuminate the entire pointer 66 during reception of a monophonic radio broadcast signal. The efficiency with which the acrylic pointer conducts light is dependent on the smoothness of the exterior surfaces. Consequently, serrations 67 in the pointer 66 reflect the light toward the operator such that it becomes visible to his eye. As the receiver is fine-tuned to a desired radio signal, the pointer 66 will glow with increasing intensity until the strongest signal is received. If an FM stereo signal is received, the fine-tuning lamp 45 will be extinguished and the stereo indicator lamp 48 will light. A light filter 68 interposed between stereo indicator lamp 45 and arm 66*b* imparts a distinct color (e.g., red) to the pointer 66 during stereo reception. Black paint, designated by the letter B in FIG. 2, may be used to cover those portions of the pointer which are not to be viewed while white paint, W, allows the pointer to be viewed when not lighted and provides a white image when lighted. Accordingly, an improved fine-tuning and FM stereo indicator system has been shown which incorporates these functions into a novel dial pointer and carriage assembly thereby eliminating tuning meters and stereo indicator lamps adjacent to the dial scale as was heretofore necessary.

While a particular embodiment of the present invention has been shown and described, it will be obvious to those skilled in the art that various changes and modifications may be made without departing from the invention in its broader aspects. The aim in the appended claims is to cover all such changes and modifications as may fall within the true spirit and scope of the invention.

We claim:

1. In a radio receiver capable of receiving stereo broadcast signals and including a dial scale, a fine-tuning and stereo indicator system comprising in combination:

fine-tuning indicator means including a first lamp for generating a variable intensity light representative of the signal strength of a received broadcast signal;

stereo indicator means for extinguishing said first lamp, said stereo indicator means including a second lamp and a light filter for generating a distinctively colored light during reception of a stereo broadcast signal;

a carriage assembly movable with respect to said dial scale in accordance with the tuning of said receiver, said first lamp and said second lamp being mounted on said carriage assembly; and a light-conductive pointer mounted on said carriage assembly adjacent said dial scale and being coupled to said first lamp and said second lamp, said pointer glowing with increased intensity as the desired broadcast frequency is fine-tuned and exhibiting a color change when a stereo broadcast signal is received.

2. A radio receiver in accordance with claim 1 wherein said carriage assembly has two preformed cylindrical cavities for mounting said first lamp and said second lamp therein and wherein said light conductive pointer is "f"-shaped with the arms of said "f" in light conducting relationship with respective ones of said lamps.

3. A radio receiver in accordance with claim 2, wherein said fine-tuning indicator means includes a first transistor having said first and said second lamps in its collector load circuit; said stereo indicator means including a second transistor having said second lamp in its collector load circuit; and wherein said second lamp has at least twice the current rating of said first lamp whereby during conduction of said second transistor, said first lamp is extinguished.

* * * * *